Inventor:
Eugen Siempelkamp
BY
Karl F. Ross
Agent

Aug. 21, 1962  E. SIEMPELKAMP  3,050,200
APPARATUS FOR STACKING SHEET MATERIALS
Filed Aug. 24, 1959  2 Sheets-Sheet 2

Inventor:
Eugen Siempelkamp
BY
Karl F. Ross
Agent

United States Patent Office 3,050,200
Patented Aug. 21, 1962

3,050,200
APPARATUS FOR STACKING SHEET MATERIALS
Eugen Siempelkamp, Hohenzollernstrasse 69,
Krefeld, Germany
Filed Aug. 24, 1959, Ser. No. 835,686
Claims priority, application Germany Oct. 23, 1958
4 Claims. (Cl. 214—16.6)

My present invention relates to a process and an apparatus for the stacking of sheet material and, more particularly, to a process and an apparatus for the stacking of rough-formed sheets for processing in multi-level presses and the like.

Systems for the processing of sheets of compacted cellulose, generally known as fiberboard sheets, have heretofore required the deposition of wood fibers or chips on a charging plate or tray individual to each sheet, the rolling of the charging trays laden with the roughly formed sheet material to a press for finish-forming, and the discharging of the press. Such systems are relatively slow, requiring rather long press times per sheet, and are therefore restricted in output.

In an improved system of this character, designed for the mass production of fiberboard sheets or the like, in the treatment described and claimed in my co-pending application Ser. No. 835,687, the roughly shaped sheets are delivered by superposed conveyors to a stack of trays on a multi-level truck which carries them to a multi-level press for further processing.

The principal object of my present invention is the provision of a process and an apparatus for expeditiously and safely transferring a series of fiberboard sheets and the like to a plurality of conveyors without the use of individual trays or plates.

A more specific object of the invention is the provision of an improved distributor system for directing low-cohesion sheets onto respective receiving conveyors to which they are delivered in rapid succession by a single supply conveyor.

A feature of my invention is the provision of a process whereby sheets to be stacked are deposited in rapid succession on a relatively slow-moving primary conveyor which pushes them onto an intermediate receiving surface from which the sheets are removed by a relatively fast-moving secondary conveyor whereby the initially small gap between the sheets is increased sufficiently to facilitate the performance of switching operation incidental to stacking. In a preferred embodiment the intermediate surface is formed by a swinging platform which, in its different operating positions, discharges onto a plurality of secondary conveyors leading to different levels of a stacking device. Advantageously, the swinging platform slopes downwardly so as to form a chute which in all operating positions has an inclination greater than the angle of friction of the sheet material on its surface.

The above and other objects, features and advantages will become more readily apparent from the following description, reference being made to the accompanying drawing in which:

FIG. 1 is a somewhat schematic side-elevational view, partly in section, showing the rough-forming and stacking sections of a plant according to my invention for the production of fiberboard and the like;

Figure 1:
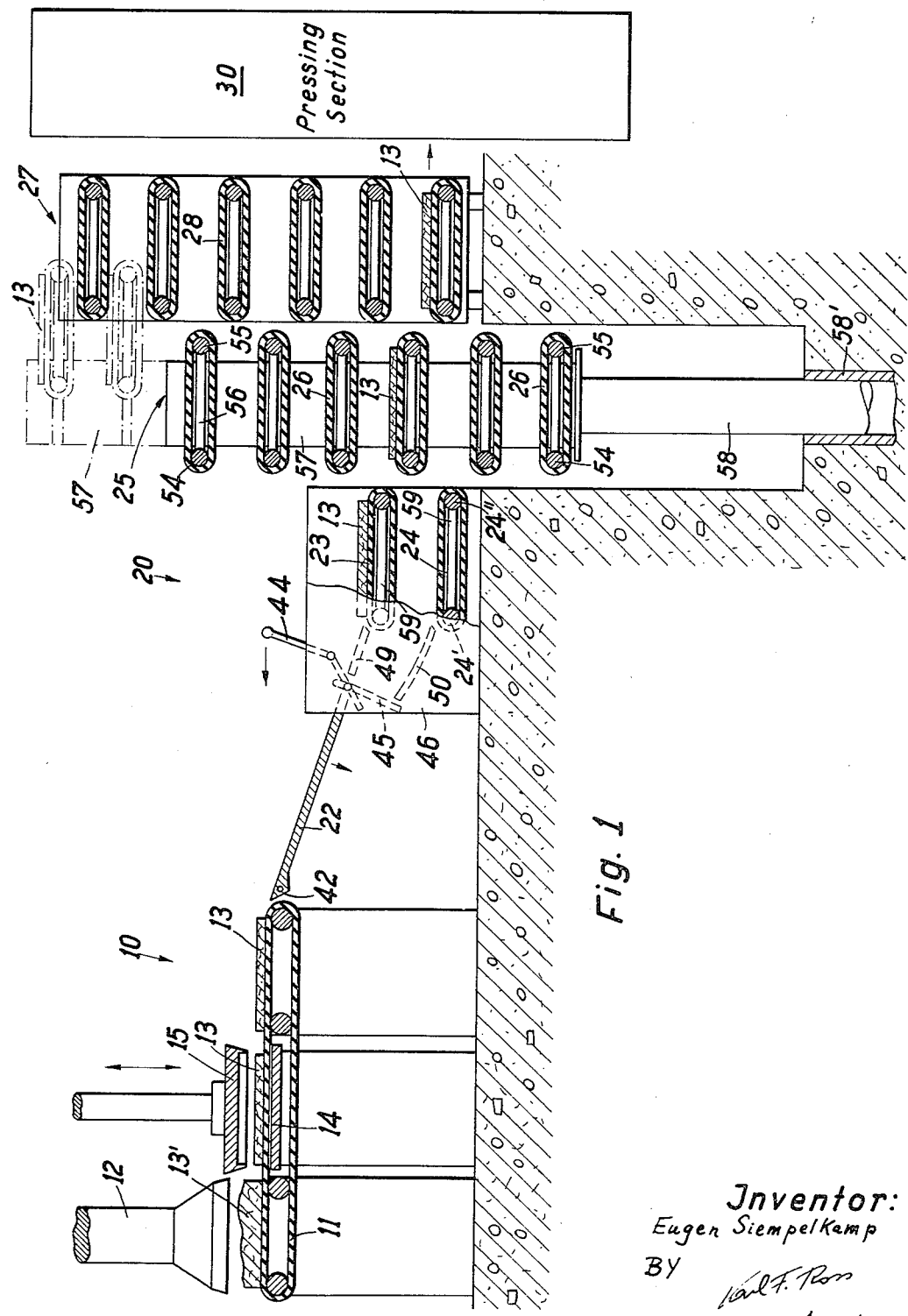

In FIG. 1 I show a sheet-processing plant comprising a rough-forming section 10, a stacking section 20 (illustrated in detail in FIG. 2), and a finish-pressing section 30 (fully described in my co-pending application mentioned above).

Section 10 includes a conveyor belt 11 upon which piles 13' of dampened fiber are successively deposited by a spreader 12. Conveyor 11 carries the piles 13' over the anvil 14 of a rough-forming press 15, which preshapes them into sheets or boards 13, and delivers the latter to the stacking section 20. This section comprises a swinging platform 22, a pair of conveyor belts 23, 24, a vertically displaceable (e.g. hydraulically controlled) conveyor rack 25 having a number of tiers of conveyor belts 26 advantageously equal to the number of levels in a multi-level press (not shown) of section 30, and a stationary conveyor rack 27, having the same number of conveyor belts 28.

Figure 2:
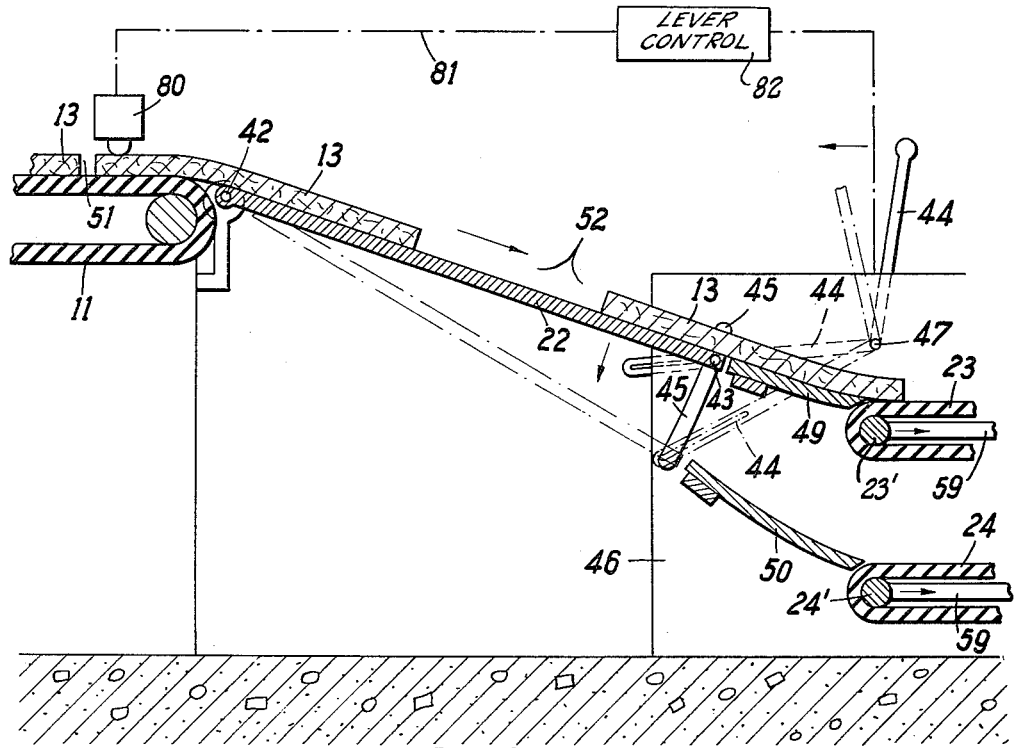
FIG. 2 is an elevational view of a detail of FIG. 1, drawn to a larger scale.

In FIG. 2 I show a detail of the stacking apparatus in which platform 22 is hinged at a pivot 42 and provided with a stud 43 displaceable within a slot 45 in each of two parallel side walls 46 (only one shown) in which the rollers 23', 24' of conveyor belts 23, 24 are journaled. The stud 43 is received within a slot provided in a bellcrank lever 44, pivoted at 47 to wall 46. Stationary platforms 49, 50 are secured to walls 46 and serve as extension chutes between swinging platform 22 and conveyor belts 23 and 24, respectively.

In operation, the roughly formed sheets 13 arrive with small inter-sheet gaps 51 from the forming press 14, 15 on conveyor belt 11 which is driven, by suitable automatic or manual means not shown, at a relatively low speed. With the swinging platform 22 positioned as shown in solid lines, incoming conveyor 11 directs the sheets 13 downwardly, in the direction shown, onto outgoing conveyor 23 by way of stationary platform 49. As soon as one sheet 13 has left platform 22, but before the leading edge of the next-following sheet has reached the end of the platform, the latter is swung about pivot 42 by means of lever 44 into the position shown in dot-dash lines, thereby causing the next sheet 13 to be directed onto conveyor 24. As soon as a board 13 contacts one of the outgoing conveyors 23, 24 whose speed considerably exceeds that of incoming conveyor 11, it is drawn gently from the platform 22 in such manner that the small gaps 51 present between successive sheets 13 are advantageously increased to a much wider space 52. To minimize the strain exerted by the outgoing conveyor upon the low-cohesion sheets 13, the angle of inclination of the platform 22 in each of the operative positions is preferably greater than the angle of friction as between the material of the sheets and the surface of platform 22.

Figure 3:
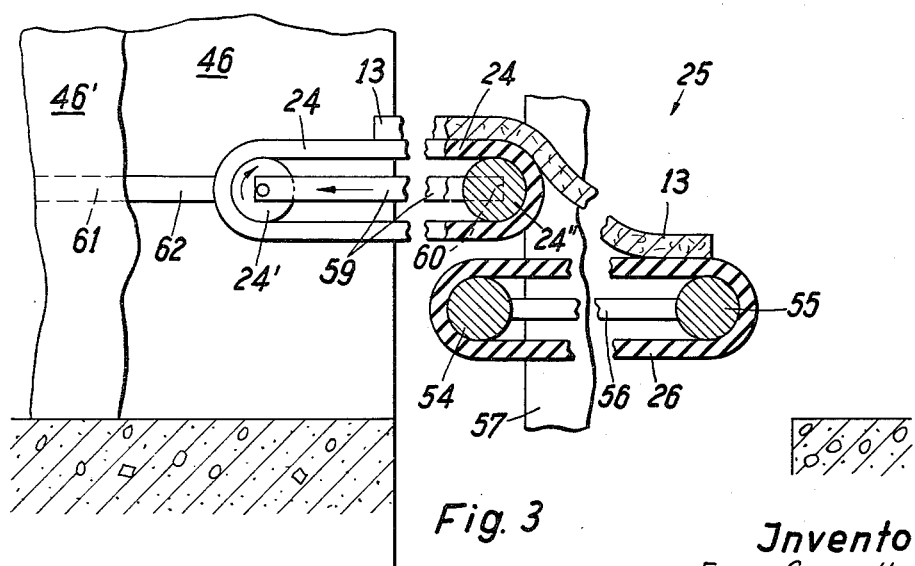
FIG. 3 is a side-elevational view, partly in section, of another detail.

The sheets 13 are then transferred by the conveyor belts 23, 24 to the elevatable conveyor rack 25 as shown in FIGS. 1 and 3. The transfer rack 25 carries conveyor belts 26, each of them supported on a pair of rollers 54, 55 journaled in a pair of crossbars 56. The crossbars 56 are slidable within appropriate channels provided in a pair of posts 57 of which only one is shown. The entire rack 25 is mounted upon a hydraulic piston 58 which may be raised and lowered within a conventional hydraulic cylinder 58' actuated by a fluid source (not shown).

The rollers 23', 24' of each outgoing conveyor belt 23, 24 are journaled, as illustrated in FIG. 3 for the belt 24, in a pair of slide bars 59 and 60 which are lodged in a pair of channels 61, 62 respectively provided in side walls 46 and 46', the latter also supporting the stationary platforms 49 and 50.

The sheets 13 may be placed upon rack 25 by positioning the conveyor belt 23 or 24 carrying a sheet 13 (FIG. 3) partially above one of the belts 26 and then rotating the belt 24 clockwise while withdrawing the conveyor unit 24, 24', 24", 59, 60 at belt speed along channels 61, 62 toward the left, thus depositing the sheet 13 upon belt 26. If the latter also rotates clockwise but at a lower speed, the speed of withdrawal should equal the difference between the speeds of the two belts. Again, only a modicum of strain will be exerted by such transfer upon the sheets which, it will be apparent, are subjected to very little tensile stress in the course of this operation.

As soon as a sheet 13 has been placed upon conveyor belt 23, the chute platform 22 is swung downwardly to place the next sheet upon conveyor 24; concurrently therewith, conveyor belt 23 deposits its load upon one of the belts 26 of rack 25 (as described above) which then receives a load from conveyor 24 while belt 23 is being reloaded. The rack 25 is raised by hydraulic piston 57 to present an empty conveyor belt 26 to the belts 23, 24 as each returns with a new load. When rack 25 is fully loaded, it rises alongside the stationary rack 27 in staggered relationship therewith so that the sheets 13 on rack 25 can now be transferred to the belts 28 of rack 27 in the same manner as the transfer of sheets from belts 23 and 24 to belts 26 had been accomplished; this operation, illustrated in dot-dash lines in FIG. 1, may proceed simultaneously for all the belts 26 and 28. The rack 25 is then lowered for the repetition of the process, while the stacked sheets are stored upon stationary rack 27 prior to further processing in press section 30 as fully described in my above-mentioned co-pending application.

It will be apparent that the above-described stacking operations may be performed semi-automatically or fully automatically, e.g. by providing means for controlling the swinging of chute 22 in response to the operation of the press 15, the movement of the conveyor belt 11 or the arrival of a gap 51 at the end of that belt. This has been illustrated schematically in FIG. 2 where a microswitch 80, designed to determine the presence of a gap 51, is shown connected via a transmission 81 including a control device 82 to the lever 44. It should further be noted that the chute 22 is shown swingable between two positions only by way of example, it being of course readily possible to adapt this chute to three or more levels of operation. These and other modifications are intended to be embraced within the spirit and scope of the present invention as defined in the appended claims.

I claim:
1. An apparatus for stacking loosely coherent sheet materials, comprising a primary conveyor; a plurality of stacked secondary conveyors horizontally spaced from said primary conveyor and disposed below the level thereof; a generally downwardly inclined swinging platform with a passive receiving surface pivotable about a horizontal pivot adjacent said primary conveyor for selective alignment with any of said secondary conveyors; means for depositing a succession of sheets on said primary conveyor with small mutual separation; means for driving said primary conveyor at a relatively low, substantially constant speed, thereby depositing said sheets successively on the receiving surface of said platform in a position for delivery to the secondary conveyor aligned therewith, means for driving each of said secondary conveyors at a relatively high, substantially constant speed, thereby removing said sheets from said platform with increased mutual separation; means for swinging said platform into alignment with another secondary conveyor upon the delivery of a single sheet to the secondary conveyor previously aligned with it whereby the next-following sheet is delivered to said other conveyor, and means for discharging each of said secondary conveyors upon the alignment of said platform with another secondary conveyor.

2. An apparatus according to claim 1, further comprising a stationary storage rack with a plurality of stacked sheet-receiving elements, the number of said elements being a multiple of the number of said secondary conveyors, a vertically movable rack with a plurality of stacked transfer conveyors equaling said elements in number and selectively alignable with said secondary conveyors for receiving sheets therefrom, means for vertically displacing said movable rack upon the discharge of said secondary conveyors for aligning the latter with a set of empty transfer conveyors, and means for simultaneously unloading all of said transfer conveyors onto said elements in a terminal position of said movable rack.

3. An apparatus according to claim 1 wherein the angle of inclination of said platform exceeds the angle of friction of the sheets on said platform in every operating position thereof.

4. An apparatus according to claim 1, further comprising control means for changing the inclination of said platform in response to the passage of an inter-sheet gap on said primary conveyor.

References Cited in the file of this patent

UNITED STATES PATENTS

| | | |
|---|---|---|
| 1,767,539 | Mason | June 24, 1930 |
| 1,801,822 | Sutherland | Apr. 21, 1931 |
| 2,006,870 | Neuman | July 2, 1935 |
| 2,275,982 | Muench | Mar. 10, 1942 |
| 2,613,825 | Setzer et al. | Oct. 14, 1952 |
| 2,724,486 | Hatch et al. | Nov. 22, 1955 |
| 2,864,516 | Rogers | Dec. 16, 1958 |
| 2,972,423 | Thurnher | Feb. 21, 1961 |